United States Patent [19]

Dharmarajan et al.

[11] Patent Number: 5,118,761
[45] Date of Patent: Jun. 2, 1992

[54] THERMOPLASTIC COMPOSITION CONTAINING A STYRENE COPOLYMER RESIN

[75] Inventors: Narayanaswami R. Dharmarajan, Highland Park; Sudhin Datta, Matawan, both of N.J.

[73] Assignee: Exxon Chemical Patents Inc., Linden, N.J.

[21] Appl. No.: 638,715

[22] Filed: Jan. 8, 1991

[51] Int. Cl.$^5$ .................. C08L 23/16; C08L 25/08
[52] U.S. Cl. .................. 525/210; 525/211; 525/217; 525/207
[58] Field of Search .................. 525/210, 217, 207

[56] References Cited

U.S. PATENT DOCUMENTS

| | | | |
|---|---|---|---|
| 3,748,316 | 7/1973 | Collette et al. | 260/80.75 |
| 3,856,765 | 12/1974 | Collette et al. | 260/80.73 |
| 4,251,644 | 2/1981 | Joffrion et al. | 525/64 |
| 4,742,116 | 5/1988 | Schepers et al. | 525/74 |

FOREIGN PATENT DOCUMENTS

| | | |
|---|---|---|
| 0140422 | 5/1985 | European Pat. Off. |
| 0140423 | 5/1985 | European Pat. Off. |
| 0295076 | 12/1988 | European Pat. Off. |
| 0321293 | 6/1989 | European Pat. Off. |

Primary Examiner—Carman J. Seccuro
Attorney, Agent, or Firm—Marthe L. Gibbons; John E. Schneider

[57] ABSTRACT

A thermoplastic composition is provided which comprises a blend of a thermoplastic such as a copolymer of styrene and maleic anhydride and a modified elastomeric component such as EPM or EPDM which has been modified with a primary amine functional monomer, such as a 2-amino-5-norbornene. The composition has improved impact strength.

14 Claims, No Drawings

THERMOPLASTIC COMPOSITION CONTAINING A STYRENE COPOLYMER RESIN

BACKGROUND OF THE INVENTION

1. Field of the Invention

The invention relates to a thermoplastic composition having improved properties such as impact strength. It particularly relates to blends of a copolymer of styrene and maleic anhydride and elastomeric EPM or EPDM which has been modified with specified functional groups.

2. Description of Information Disclosures

Various blends of engineering thermoplastics and elastomers are known.

U.S. Pat. No. 4,742,116 discloses a thermoplastic moulding composition comprising a mixture of (A) copolymer of styrene and/or alpha methylstyrene and maleic anhydride, and (B) an ethylene-propylene modified rubber or an ethylene-propylene-diene modified rubber, said rubber having been modified by grafting thereto a compound containing hydroxyl, amide or amine groups.

European Publication 0140422-A1 published May 8, 1985 (European Patent Application 842013807 filed Sep. 27, 1984) discloses a process for preparing a thermoplastic moulding composition by mixing styrene and/or methylstyrene, maleic anhydride with a rubber modified with hydroxyl groups (e.g. EPM or EPDM rubber), in the presence of a specified amount of reaction accelerator such as an organic compound of a metal of groups II, III, and IV of the Periodic Table of Elements.

U.S. Pat. No. 3,856,765 discloses copolymers of ethylene, propylene, with or without a diene, and functional monomer which may be a 2-substituted-5-norbornene.

European Patent Publication 0321293 published Jun. 21, 1989 (European Patent Application 88311965-3 filed Dec. 16, 1988) discloses improved polybutylene terephthalate molding composition comprising a minor amount of a copolymer of ethylene, a higher alpha olefin, optionally a polymerizable non-conjugated diene, and a 2-substituted-5-norbornene in which the substituent of said norbornene may be carboxyl, hydroxyalkyl, amino, N-aminoalkyl or N-aminoaryl.

European Publication No. 0295076 published Dec. 14, 1988 based on European patent application 88305222.7 filed June 8, 1988 discloses ethylene-propylene elastomers comprising a 2-substituted-5-norbornene monomer.

U.S. Pat. 4,251,644 discloses blends of modified EPM or modified EPDM polymers with polyesters such as dacron or polyamides such as nylon. The modified EPM or EPDM incorporates highly polar groups such as amine groups, amide groups, thio groups, ether groups, and ester groups.

Although the known blends of thermoplastic engineering plastic and elastomers have some improved properties, there is still a need to improve the properties of thermoplastic engineering plastics, such as, for example, the copolymers of styrene and maleic anhydride.

It has now been found that properties, such as impact strength of a thermoplastic, such as a copolymer of styrene and maleic anhydride, can be improved by blending it with an elastomeric EP or EPDM which has been modified to comprise specified functional groups.

SUMMARY OF THE INVENTION

In accordance with the invention, there is provided a thermoplastic composition comprising a blend of: (a) a thermoplastic component selected from the group consisting of a copolymer of styrene and maleic anhydride, a copolymer of alpha methylstyrene and maleic anhydride, a copolymer of styrene and acrylic acid; a terpolymer of styrene, maleic anhydride and methyl acrylate; a terpolymer of styrene, maleic anhydride and acrylonitrile, and mixtures thereof; and (b) a primary amine-containing elastomeric polymer selected from the group consisting of (i) a copolymer of ethylene, at least one higher alpha olefin, and a primary amine, and (ii) a terpolymer of ethylene, at least one higher alpha olefin, a non-conjugated diene, and a primary amine, wherein said primary amine is selected from the group consisting of linear amines represented by the formula $CH_2=CH-(C_nH_{2n})-NH_2$; a norbornyl amine represented by the formula $R-(C_nH_{2n})-NH_2$, wherein n is an integer ranging from 0 to 10 and wherein R is a norbornyl group selected from the group consisting of a bicyclo [2.2.1]-hept-5-en-2-yl of the formula:

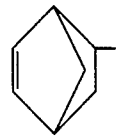

and a bicyclo [2.2.1]-hept-2-en-7-yl of the formula:

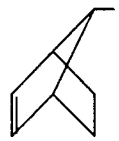

and mixtures thereof.

DETAILED DESCRIPTION OF THE INVENTION

The thermoplastic composition of the present invention comprises a blend of a thermoplastic component, an elastomeric copolymer of ethylene and a higher alpha olefin (e.g. EPM) or a terpolymer of ethylene, a higher alpha olefin and a diene (e.g. EPDM) wherein the elastomer has been modified with a functional group. The composition may also comprise conventional fillers, processing aids, antioxidants, and the like.

The Thermoplastic Component (a)

The thermoplastic component is a styrene copolymer or terpolymer selected from the group consisting of a copolymer of styrene and/or alpha methylstyrene and maleic anhydride; a copolymer of styrene and acrylic acid; a terpolymer of styrene, maleic anhydride and methyl acrylate; a terpolymer of styrene, maleic anhydride and acrylonitrile, and mixtures thereof. Preferably, the thermoplastic component is a copolymer of styrene and/or alpha methylstyrene which may suitably comprise from about 1 to about 25 weight percent, preferably from about 5 to about 20 weight percent maleic moieties. By "maleic moieties" with reference to the polymers is intended herein a group derived from maleic acid or from maleic anhydride. After incorporation in the polymer, the maleic derived group is a succinimide group. More preferably, the thermoplastic component is a copolymer of styrene and maleic anhydride. The weight average molecular weight of the styrene and/or alpha methylstyrene and maleic anhydride copolymers may range from about 30,000 to about 500,000, preferably from about 100,000 to about 400,000, as determined in accordance with the method described in Journal of Applied Polymer Science, Vol. 20, 1619 to 1626 (1976). The copolymers of styrene and/or alpha methylstyrene and maleic acid are known.

Generally, the total amount of the thermoplastic component of the composition may range from about 5 to about 95, preferably from about 10 to about 90 weight percent, based on the total composition.

The Primary Amine-Containing Elastomeric Component (b)

The primary amine-containing elastomeric polymer suitable as component of the present composition is an elastomeric copolymer of ethylene, and at least one higher alpha olefin, said copolymer having been modified with certain functional groups or an elastomeric terpolymer of ethylene, at least one higher alpha olefin, and at least one non-conjugated diene, said terpolymer having been modified with certain functional groups.

Suitable elastomeric copolymers include random copolymers of ethylene and at least one higher alpha olefin. The term "higher alpha olefin" is used herein to denote an alpha olefin having a higher molecular weight than ethylene. The higher alpha olefin may be a $C_3$ to $C_{16}$ alpha olefin, such as propylene, 1-butene, 1-pentene, 1-hexene, 1-octene, 1-dodecene, and mixtures thereof. Preferably, the higher alpha olefin is propylene. The elastomeric copolymers useful in this invention may suitably comprise from about 20 to about 90 weight percent ethylene, preferably from about 30 to about 85 percent ethylene. The elastomeric copolymer will generally have a weight average molecular weight (Mw) in the range of about 10.000 to about 1,000,000 or higher, typically from about 15,000 to about 500,000 and be substantially amorphous. By "substantially amorphous" with reference to the copolymer is intended herein a degree of crystallinity of less than about 25%, preferably less than about 15%, as measured by conventional test methods. The preferred elastomeric copolymer is an ethylene-propylene copolymer rubber, herein designated EPM. Processes for producing such elastomeric monoolefin copolymers are well known and form no part of this invention. EPM elastomers are commercially available.

The terpolymers suitable for practice of the present invention include terpolymers of ethylene, at least one higher alpha olefin, and at least one non-conjugated diene. The terpolymer is generally substantially amorphous and can have a substantially random arrangement of at least the ethylene and the higher alpha olefin monomers.

The terpolymer will generally have a weight average molecular weight (Mw) in the range between about 10,000 and 1,000,000 or higher, typically between about 15,000 and 500,000, and more typically between about 20,000 and 350,000.

Typically, the terpolymer is "substantially amorphous," and when that term is used to define the terpolymer, it is to be taken to mean having a degree of crystallinity less than about 25 percent, preferably less than about 15 percent, and more preferably less than about 10 percent, as measured by means known in the art.

The terpolymer useful for the practice of the present invention may comprise from about 20 to 90 weight percent ethylene, preferably about 30 to 85 weight percent ethylene, and even more preferably about 35 to about 80 weight percent ethylene.

The higher alpha-olefins suitable for use in the preparation of the terpolymer are preferably $C_3$–$C_{16}$ alpha-olefins. Illustrative non-limiting examples of such alpha-olefins are propylene, 1-butene, 1-pentene, 1-hexene, 1-octene, and 1-dodecene. The alpha-olefin content of the terpolymer is generally from about 10 to about 80 weight percent, preferably from about 20 to about 70 weight percent. The preferred alpha-olefin for the purposes of this invention is propylene.

The non-conjugated dienes suitable for use in the preparation of the terpolymer include dienes having from 6 to 15 carbon atoms. Such diene monomers are selected from polymerizable dienes. Representative examples of suitable non-conjugated dienes that may be used to prepare the terpolymer include:

a. Straight chain acyclic dienes such as : 1,4 hexadiene; 1,5-heptadiene; 1-6 octadiene.
b. Branched chain acyclic dienes such as: 5-methyl-1, 4-hexadiene; 3, 7-dimethyl 1-6-octadiene, and 3,7-dimethyl 1, 7-octadiene.
c. Single ring alicyclic dienes such as: 4-vinylcyclohexene; 1-allyl, 4-isopropylidene cyclohexane; 3 allyl-cyclopentene; 4-allyl cyclohexene; and 1-isopropenyl-4-butenyl cyclohexane.
d. Multi ring alicyclic fused and bridged ring dienes such as: dicyclopentadiene; alkenyl, alkylidene, cycloalkenyl and cycloalkylidene norbornenes such as: 5-methylene-2-norbornene 5-methylene-6-methyl-2-norbornene; 5-methylene-6, 6-dimethyl-2-norbornene; 5-propenyl-2-norbornene; 5-(3-cyclopentenyl)-2-norbornene; 5-ethylidene-2-norbornene; and 5-cyclohexylidene-2-norbornene, etc.

The preferred dienes are selected from the group consisting of 1,4-hexadiene; dicyclopentadiene; 5-ethylidene-2-norbornene; 5-methylene-2-norbornene; and mixtures thereof.

The total diene monomer content in the terpolymer may suitably range from about 0.1 to about 15 weight percent, preferably 0.5 to about 12 weight percent, and most preferably about 1.0 to about 6.0 weight.

Preparations of terpolymers of ethylene, a higher alpha olefin and a non-conjugated diene of the type described above are well known and form no part of this invention. The preferred terpolymers for the practice of the invention are terpolymers of ethylene, propylene and a non-conjugated diene (EPDM). Such terpolymers are commercially available.

The elastomeric ethylene copolymer or ethylene terpolymer described above are modified so as to incorporate a small amount, suitably about 0.1 to 15 weight percent, preferably about 0.25 to 10 weight percent based on the weight of the copolymer or terpolymer, respectively, of a primary amine selected from the group consisting of linear amines of the formula (I): $CH_2=CH-(C_nH_{2n})-NH_2$, a norbornyl amine of the formula (II): $R-(C_nH_{2n})-NH_2$ wherein R is a norbornyl group selected from the group consisting of a bicyclo [2.2.1]-hept-5-en-2-yl of the formula:

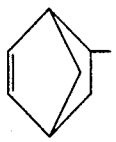

bicyclo [2.2.1]-hept-2-en-7-yl of the formula:

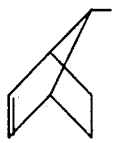

and mixtures thereof;

Representative examples of suitable primary linear amines include allyl amine, 1-butenyl amine and the like.

Representative examples of suitable norbornyl amines include a 2-amino-5-norbornene such as 2-methyl amine-5-norbornene, 2-ethyl amine-5-norbornene; 3-methyl amine-5-norbornene; 5-norbornene-7-methyl amine, and the like.

Preferably, the primary amine is a 2-amino-5-norbornene, represented by the formula:

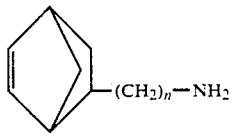

in which n ranges from 0 to 3. A resin of the modified elastomeric ethylene copolymer or terpolymer of the present invention will comprise a primary amino functional group and will generally have a Mooney viscosity ranging from about 5 up to about 100 when measured at 127° C. according to ASTM D-1246.

The modified ethylene higher alpha olefin elastomers of the present invention can be prepared by procedures known in the art, provided that the resulting modified elastomer comprises a primary amino functionality. Thus, if a primary amine is used in a reaction mixture with EP or EPD polymers and the resulting elastomer does not contain a primary amino group, then such a polymer would be outside the scope of the present invention. They can be prepared by grafting a primary amino group-containing component onto the ethylene-higher alpha olefin copolymer or (e.g. EP) ethylene-higher alpha olefin terpolymer or by copolymerization of the amine with the ethylene-higher alpha olefin polymer or said terpolymer (EPD) or by reaction of a primary amine with a functionalized EP or EPD polymer. They can be prepared, for example, by the procedures set forth in U.S. Pat. Nos. 3,884,888, 3,748,316, 3,796,687, 3,901,860 or 4,017,669, the teachings of which are hereby incorporated by reference. These patents disclose the preparation of elastomeric ethylene random terpolymers and tetrapolymers from alpha-olefins non-conjugated dienes and unsaturated functional monomers by direct Ziegler-Natta polymerization of the monomers, usually in solvent, utilizing catalyst systems composed of trivalent, and higher, vanadium compounds, organoaluminum compounds and halogenated reactivator compounds. These polymerization reactions are conducted in the absence of moisture in an inert atmosphere and in a preferred temperature range of 0° to 65° C. Both continuous and batch reactions are taught.

The modified copolymers of ethylene and a higher alpha olefin suitable for the practice of this invention can also be prepared by the process disclosed European Publication No. 0295076 published Dec. 14, 1988 based on European patent application 88305222.7 which corresponds to allowed U.S. patent application Ser. No. 059,711, the teachings of which are hereby incorporated by reference. In accordance with the disclosure of this European publication, ethylene, alpha-olefins, non-conjugated dienes and unsaturated functional monomers chemically "masked" by pre-reaction with certain non-halogenated organometallic compounds, can be copolymerized in a conventional Ziegler-Natta polymerization reaction utilizing, e.g., vanadium, zirconium or titanium catalysts with organoaluminum co-catalysts and conducted generally in solvent at temperatures ranging preferably from about 15°–60° C. The modified copolymers or terpolymers of ethylene and propylene useful in the practice of the present invention can then be produced by de-ashing the initially formed polymer by known methods utilizing various aqueous liquids, separating the resulting aqueous phase from polymer-rich solvent phase and separating the polymer from the polymer-rich solvent phase.

In the composition of the present invention suitable amount of modified elastomeric component ranges from about 5 to about 95 weight percent, preferably from about 10 to about 90 weight percent, more preferably from 10 to 40 weight percent, based on the weight of the thermoplastic component (a). When more than one thermoplastic component is present in the composition, the modified elastomeric component may be present in an amount ranging from about 5 to about 95, preferably from about 10 to about 90 weight percent, more preferably from 10 to 40 weight percent, based on the sum of the weight of all the thermoplastic components.

Preferably, the compositions of the present invention have a secant flexural modulus ranging from about 10,000 kg/cm$^2$ to about 35,000 kg/cm$^2$ measured in accordance to ASTMD 790 at 1% strain.

The particle size (absolute) of the modified elastomeric component dispersed in the thermoplastic composition may range from about 0.01 to about 20 microns, preferably from about 0.01 to about 5 microns, more preferably from about 0.1 to 4 microns.

In the thermoplastic compositions prepared in accordance with the present invention, the modified copolymer or terpolymer can be used as such or various mixtures of such modified copolymers or terpolymers or mixtures thereof can be employed. The composition may also contain conventional components such as reinforcing agents, for instance, glass fibers, carbon fibers and asbestos; fillers exemplified by silica, alumina, silica-alumina, silica-magnesia, calcium silicate, calcium carbonate, titanium dioxide, talc, glass beads, glass flakes and the like; lubricants such as higher fatty acids and paraffin waxes, stabilizers; anti-static agents; antioxidants; fire retardants; dyes; pigments; plasticizers; mold release agents and the like. Furthermore, other polymers may be included in the composition.

The thermoplastic component, e.g. styrene-maleic anhydride, modified elastomeric polymer, and, if used, conventional additives are mechanically blended and molded in a known manner. The method of preparing the blends is not a critical aspect of the present invention and the components may be admixed in any order using standard polymer blending techniques and apparatus. Generally the components may be mixed in a mixer, such as a ribbon blender, V-shaped blender, tumbler or Henschel mixer, and then melt-kneaded at temperatures of about 120° C. to 310° C., preferably about 180° C. to 260° C., in a Brabender ® mixer, Banbury ® mixer, single or twin screw extruder, rolling mill, continuous extruder or the like. For example, suitably dried and preselected amounts of the ingredients can be mixed in a blender and fed into a single screw extruder and grinder for pelletization. The resulting pellets or granules may thereafter be injection molded.

A preferred method of blending the components is to blend them in an intensive shear mixing equipment which can maintain a temperature above the melting point of the thermoplastic component. Typically, the temperature ranges from about 175° to 250° C. in, for example, Brabender ® mixers, Banbury ® mixers (for batch mixing) as well as single and twin extruders (for continuous mixing). Preferably the shearing is performed at conditions to disperse the modified elastomeric polymer in said thermoplastic component in the desired particle size. Mixing in solution at high temperatures may also be performed, although it is not the preferred method. Typically the mixing time is between 3 to 20 minutes at temperatures of 200° C. to 215° C., with more or less mixing time required for lower or higher temperatures of mixing, respectively.

Although this invention is not intended to be dependent on any proposed theory of reaction mechanism, it is believed that during the blending of the components of the present invention, a chemical reaction occurs between the thermoplastic component (a) and the elastomeric polymer (b) such that segments of component (a) are grafted unto the backbone chain of the elastomeric component (b). The grafting is believed to be accomplished by the reaction, for example, of the maleic anhydride residues of styrene-maleic anhydride with a reactive functionality of the elastomeric polymer (b). In blends of 80 to 20 component (a) to component (b), only a minor portion e.g. only about 2 to 5% of the maleic anhydride residues are expected to be reacted. The thus formed reaction product is believed to function as a compatibilizer in the compositions of the present invention.

The thermoplastic composition of the present invention is suitable, for example, for the manufacture of automotive parts such as instrument panels, outdoor recreational equipment, weatherable liners in swimming pools, and the like.

PREFERRED EMBODIMENTS

The following examples are presented to illustrate the invention. All parts and percentages in the examples are by weight, unless otherwise specified.

In the following examples, Polymer A is an elastomeric ethylene-propylene copolymer comprising about 45 weight percent ethylene and having a Mooney Viscosity in accordance to ASTM test D1646 (ML 1+4) at 125° C. of 28. Polymer B is a styrene-maleic anhydride copolymer comprising 8 weight percent of maleic anhydride. Polymer F is a styrene-maleic anhydride copolymer comprising 14 weight percent maleic anhydride.

EXAMPLE 1

Varying proportions of an ethylene-propylene-amine polymer containing about 44 wt. % ethylene and having a Mooney Viscosity (ML 1+4) at 125° C. of 25, an amine content of 1.2 wt. %, wherein the amine monomer is 5-norbornene-2-methyl amine, said polymer being hereinafter referred to as Polymer C, and Polymer B were blended for 4 minutes at a temperature ranging from about 335° to 445° F. (170° C. to about 230° C.) in a Brabender mixer using a batch size of about 300 gm. The blends, were ground to pellets and injection molded into test specimens. These compositions, which were in accordance with the present invention, were subjected to tests.

A control blend was prepared using Polymer B which was the same as the above described compositions except that Polymer A was used instead of Polymer C. The resulting composition, herein designated Composition 7, was a comparative composition which was not in accordance with the present invention. The results of these tests are shown in Table I. Compositions 1 through 6 in Table I were compositions in accordance with the present invention.

TABLE I

| Compositions | 1 | 2 | 3 | 4 | 5 | 6 | 7 |
|---|---|---|---|---|---|---|---|
| Polymer B | 100 | 90 | 85 | 80 | 75 | 70 | 70 |
| Polymer C | — | 10 | 15 | 20 | 25 | 30 | — |
| Polymer A | — | — | — | — | — | — | 30 |
| Tests |   |   |   |   |   |   |   |
| Notched Izod Impact (ft-lb/in) |   |   |   |   |   |   |   |
| @ RT (Room Temp.) | 0.3 | 0.8 | 1.1 | 2.4 | 4.9 | 5.4 | 0.3 |
| @ −40° C. | 0.2 | 0.6 | 1.0 | 1.2 | 1.6 | 1.9 | 0.1 |
| Flexural Modulus (kpsi) |   |   |   |   |   |   |   |
| @ RT | 447 | 408 | 337 | 322 | 274 | 248 | 215 |
| Heat Distortion Temperature (°C.) |   |   |   |   |   |   |   |
| @ 264 psi | 94 | 92 | — | 88 | 86 | 87 | — |
| Tensile Strength, (psi) | 8000 | 5990 | — | 4510 | — | 3810 | — |

The test methods used are shown in Table II.

TABLE II

| Test | Method |
|---|---|
| Notched Izod Impact (ft-lb./in.) | D256, Method A |
| Unnotched Izod Impact (ft-lb./in.) | D256, Method A |
| Flexural modulus, kpsi | D790, Method I |
| Mooney viscosity (1 + 4 min) @ 125° C. | D3958 |
| Tensile Strength, psi | D638 |
| Tear Die-C (lb/in) | D624 |
| Heat Distortion Temperature (°C.) @ 264 psi load | D1637 |

As shown by the data in Table I, the blending of a small amount of an ethylene-propylene-amine polymer (Polymer C) into a styrene-maleic anhydride copolymer (Polymer B) gave an unexpected increase in notched Izod impact strength.

EXAMPLE 2

A 770 gram sample of an ethylene-propylene-amine polymer, herein designated Polymer D, containing 45 weight percent ethylene and 1.2 weight percent amine, and having a Mooney Viscosity (ML 1+4) at 125° C. of 16, and a 770 gram sample of an ethylene-propylene-amine polymer, herein designated Polymer E, containing 45 weight percent ethylene and 1.3 weight percent amine and having a Mooney Viscosity (ML 1+4) at 125° C. of 14 where each blended with 330 grams of Polymer B, that is, a styrene-maleic anhydride polymer at 400° to 420° F. (204° to 215° C.) for 5 minutes in a B-Banbury mixer. The amine monomer of Polymers D and E was 5-norbornene-2-methyl amine. An additional blend of the same ratio of components comprising Polymer A, an elastomeric ethylene-propylene copolymer, (used instead of Polymer D or Polymer E) and Polymer B, styrene-maleic anhydride polymer, was used as a comparative composition. The resulting blends, Compositions 8, 9, and 10, respectively, were molded into plaques and tested. The results are shown in Table III.

TABLE III

| | COMPOSITION | | |
|---|---|---|---|
| Test | 8 (Polymers B + D) | 9 (Polymers B + E) | 10 (Polymers B + A) |
| Tensile, psi | 317 | 429 | 463 |
| Elongation, % | 87 | 81 | 48 |
| Tear, lb./in. | 69 | 87 | 63 |
| Appearance | Good, no delamination | Good, no delamination | Poor, delamination |

As can be seen from Table III. Compositions 8 and 9, which were compositions in accordance with the present invention, had improved elongation and surface properties compared to comparative Composition 10, which was not a composition in accordance with the present invention.

EXAMPLE 3

Varying proportions of ethylene-propylene-amine polymer containing about 45 wt.% ethylene and having a Mooney Viscosity ML (1+4) 125° C. of 16, an amine content of 1.2 wt. %, wherein the amine monomer is 5-norbornene-2-methyl amine, said polymer being hereinafter referred to as polymer G and Polymer F were blended for 4 minutes at temperatures ranging from about 335° to 445° F. (170° C. to about 230° C.) in a Brabender mixer using a 300 gm batch size. The blends after grinding to pellets were injection molded in a Boy ® injection molding machine using the following conditions: Nozzle Temperature=200° C., Middle Barrel Temperature=190° C., Rear Barrel Temperature=190° C., Injection Time=8 seconds and cooling time=28 seconds. The molded specimens were subjected to tests. The results are shown in Table IV. As shown in the data in Table IV, the blending of a small amount of ethylene-propylene amine polymer (Polymer G) gave an improvement in impact strength over the unmodified styrene-maleic anhydride polymer (Composition 11). Compositions 12, 13, 14, and 15 were compositions in accordance with the present invention.

TABLE IV

| Compositions | 11 | 12 | 13 | 14 | 15 |
|---|---|---|---|---|---|
| Polymer F | 100 | 90 | 85 | 80 | 75 |
| Polymer G | — | 10 | 15 | 20 | 25 |
| Notched Izod Impact (ft-lb/in) | | | | | |
| @ RT | 0.3 | 1.0 | 1.3 | 2.4 | 4.1 |
| @ 0° C. | 0.3 | 0.6 | 1.0 | 2.0 | 3.3 |
| Flexural Modulus (Kpsi) | 437 | 337 | 327 | 286 | 255 |
| Heat Distortion Temperature (0° C.) | | | | | |
| @ 264 psi | 103 | 100 | 102 | 103 | 101 |
| Unnotched Izod Impact (ft-lb/in) | | | | | |
| @ RT | 3.1 | 9.7 | 12.2 | 9.0 | 12.9 |

COMPARATIVE EXAMPLE A

A solution of 75 grams of a terpolymer of ethylene, propylene, and 5-ethylidene-2-norbornene, herein designated ENB, containing 53% ethylene and 4.5% ENB with a Mooney Viscosity of $M_L$ (1+4) of 34 at 125° C. in 750 ml of xylene was dried and deaerated by refluxing the solution for 15 minutes at atmospheric pressure under nitrogen. The solution was maintained at the reflux temperature (139° C.) and to it was added a primary amine (M), followed by x grams of benzoyl peroxide, a free radical source, as a saturated solution of xylene. The primary amines added to the solution respectively were 5-norbornene-2-methylamine (NMA); isopropyl aniline, and allyl amine. The polymer was permitted to react for 15 minutes and was then recovered by removing the bulk of the solvent by steam distillation followed by drying in a vacuum oven at 110° C. Exactly 60 grams of this polymer was blended with 240 grams of Polymer B, which was a styrene maleic anhydride copolymer comprising 8 weight percent of maleic anhydride, in a high intensity Brabender ® mixer with a cavity volume of about 300 cc. operating at 40 rpm and at a maximum temperature of 195° C. for 3 minutes. The resulting blend was injection moulded into test specimens under the conditions previously described and tested for Notched Izod Impact strengths. This experiment was repeated for various concentrations of the primary amine and of x. The results are summarized in Table V.

TABLE V

| Composition | Primary Amine (M) | x | Notched Izod Impact (ft-lb/in) at 21° C. |
|---|---|---|---|
| 16 | 3.6 gm NMA | 0.2 | 0.3 |
| 17 | 3.6 gm NMA | 0.4 | 0.3 |
| 18 | 3.6 gm NMA | 0.8 | 0.9 |
| 19 | 3.6 gm NMA | 1.4 | 0.6 |
| 20 | 7.2 gm NMA | 1.4 | 0.4 |
| 21 | 3.9 gm NMA isopropenyl aniline | 1.4 | 0.5 |
| 22 | 3 gm of allyl amine | 0.8 | 0.9 |

As can be seen from Table V, Compositions 16 through 22, which were not compositions in accordance with the present invention, had low impact strength, as shown by the lower Notched Izod Impact value. The modified ethylene-propylene-diene (EPDM) polymers resulting from this method of preparation did not contain a primary amine functionality. Compare these compositions to Composition 4 of Example 1 in which the Notched Izod Impact was 2.4.

COMPARATIVE EXAMPLE B

A solution containing 75 grams of an ethylene-propylene copolymer containing 46% ethylene with a Mooney Viscosity of $M_L$ (1+4) of 42 at 125° C. in 750 ml of xylene was dried at atmospheric pressure under nitrogen. The solution was maintained at the reflux temperature (139° C.) and to it was added a primary amine (N), followed by y grams of benzoyl peroxide, a free radical source, as a saturated solution in xylene. The polymer was allowed to react for 15 minutes and was then recovered by removing the bulk of the solvent by steam distillation, followed by drying in the vacuum oven at 110° C. Exactly 60 grams of this polymer was blended with 240 grams of Polymer B (copolymer of styrene and maleic anhydride comprising 8 wt. % maleic anhydride) in a high intensity Brabender® mixer with a cavity of approximately 300 cc operating at a maximum temperature of 195° C. for 3 minutes.

The resulting blend was injection moulded into test specimens under the conditions described previously and tested for Notched Izod Impact strengths. This experiment was repeated for various values of N and y. The results are shown in Table VI.

TABLE VI

| Composition | Primary Amine (N) | y | Notched Izod Impact (ft-lb/in) at 21° C. |
|---|---|---|---|
| 23 | 3.6 gm NMA | 0.2 | 0.3 |
| 24 | 3.6 g NMA | 0.4 | 0.4 |
| 25 | 3.6 g NMA | 0.8 | 1.0 |
| 26 | 3.6 g NMA | 1.4 | 0.6 |
| 27 | 7.2 g NMA | 1.4 | 0.6 |
| 28 | 3.9 g of isopropenyl aniline | 1.4 | 0.4 |
| 29 | 3.9 g of Allyl amine | 0.8 | .0.7 |

As can be seen from Table VI, Compositions 23 through 29, which were not compositions in accordance with the present invention, had low impact strength as shown by the lower Notched Izod Impact value. The modified ethylene-propylene (EPM) polymers resulting from this method of preparation did not contain a primary amine functionality. Compare these compositions to Composition 4 of Example 1 in which the Notched Izod Impact was 2.4.

What is claimed is:

1. A thermoplastic composition comprising a blend of:
   (a) a thermoplastic component selected from the group consisting of a copolymer of styrene and maleic anhydride, a copolymer of alpha methylstyrene and maleic anhydride, a copolymer of styrene and acrylic acid; a terpolymer of styrene, maleic anhydride and methyl acrylate; a terpolymer of styrene, maleic anhydride and acrylonitrile, and mixtures thereof; and
   (b) a primary amine-containing elastomeric polymer selected from the group consisting of (i) a random copolymer of ethylene, at least one higher alpha olefin, and a primary amine, and (ii) a random terpolymer of ethylene, at least one higher alpha olefin, a non-conjugated diene, and a primary amine, wherein said primary amine is selected from the group consisting of linear amines represented by the formula $CH_2=CH-(C_nH_{2n})-NH_2$; a norbornyl amine represented by the formula $R-(C_nH_{2n})-NH_2$, wherein n is an integer ranging from 0 to 10 and wherein R is a norbornyl group selected from the group consisting of a bicyclo [2.2.1]-hept-5-en-2-yl of the formula:

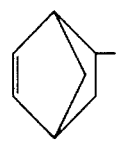

a bicyclo [2.2.1]-hept-2-en-7-yl of the formula:

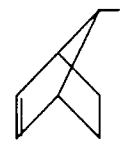

and mixtures thereof.

2. The thermoplastic composition of claim 1 wherein said primary amine-containing elastomeric polymer is present in said composition in an amount ranging from about 5 to about 95 weight percent.

3. The thermoplastic composition of claim 1 wherein said primary amine-containing elastomeric polymer comprises from about 10 to about 90 weight percent of said ethylene.

4. The thermoplastic composition of claim 1 wherein said primary amine-containing elastomeric polymer comprises from about 0.1 to about 15 weight percent of said primary amine.

5. The thermoplastic composition of claim 1, wherein said terpolymer comprises from about 0.1 to about 15 weight percent of said diene.

6. The thermoplastic composition of claim 1, wherein said higher alpha olefin is propylene.

7. The thermoplastic composition of claim 1, wherein said primary amine is a norbornyl amine.

8. The thermoplastic composition of claim 1, wherein said norbornyl amine is a 2-amino-5-norbornene.

9. The thermoplastic composition of claim 8, wherein said 2-amino-5-norbornene is 2-methylamine-5-norbornene.

10. The thermoplastic composition of claim 1, wherein said primary amine-containing elastomeric polymer is present in said composition as particles dispersed in said (a) thermoplastic, said particles having a size ranging from about 0.01 to about 20 microns.

11. The thermoplastic composition of claim 1, wherein said (a) thermoplastic is a copolymer of styrene or alpha methylstyrene and maleic anhydride comprising from about 1 to about 25 weight percent maleic anhydride.

12. The thermoplastic composition of claim 10, wherein said styrene-maleic anhydride copolymer or said alpha methylstyrene-maleic anhydride copolymer comprises from about 5 to about 20 maleic anhydride.

13. The thermoplastic composition of claim 1, wherein said composition has a flexural modulus ranging from about 10,000 kg/cm² to about 35,000 kg/cm² measured according to ASTMD 790 at 1% strain.

14. The thermoplastic composition of claim 1, wherein said composition additionally comprises a reaction product of said thermoplastic (a) with said primary amine-containing elastomeric polymer (b).

* * * * *